Oct. 18, 1955     W. R. CUSTER     2,721,045
JET-PROPELLED AIRCRAFT WITH EXTENDABLE INTAKE CHANNEL
Filed June 15, 1954

INVENTOR
WILLARD R. CUSTER

BY *Semmes & Semmes*
ATTORNEYS

United States Patent Office 2,721,045
Patented Oct. 18, 1955

2,721,045

JET-PROPELLED AIRCRAFT WITH EXTENDABLE INTAKE CHANNEL

Willard R. Custer, Hagerstown, Md.

Application June 15, 1954, Serial No. 436,779

9 Claims. (Cl. 244—12)

The present invention relates generally to jet propelled aircraft and more particularly to aircraft of this type employing a Custer channel. The present invention constitutes an improvement of the device of my previous Patents 2,611,555, September 23, 1952, and 2,665,083, January 5, 1954.

It is well known in the art, and also from my prior patents, referred to above, that jet propelled aircraft presently in use lack stability during critical periods existing at take-off and landing. In my previous patents the difficulties encountered in jet propelled aircraft have been clearly set forth.

It has been shown that the Custer channel wing, when utilized in conjunction with a jet engine, overcomes the drawbacks of the prior known devices in that an ample air supply is provided for the engine and extremely high lift is available during take-off and landing operations. It has further been shown that the increase in lift is caused by the reaction of air, induced at high velocity, flowing over the fixed surface of a channel both forward and rearward of the jet engine. The resultant high lift provides increased stability and safety in the take-off and landing.

The increase in lift afforded by use of the Custer channel in jet aircraft enables the aircraft to sustain itself in low speed operation until conventional reaction to thrust provides increased velocity in the aircraft.

It has now been found that providing an extendable Custer channel, mounted in the leading edge of a jet tube in a fuselage, or in the lifting surface, and which leads to a jet intake duct results in highly advantageous characteristics in such aircraft.

Accordingly, an object of the present invention is to improve the operation of jet propelled aircraft incorporating Custer channels in the fuselage or lifting surfaces of the aircraft.

Another object of the present invention is to make it possible to vary the lift of the aircraft by projecting or retracting a Custer channel out of or into the leading edge of the tube in which the jet engine is mounted for insuring a higher lift on take off or climbing. During normal flight of the aircraft after take-off, the lift and drag can be decreased by retracting the extendable channel.

It is known from my previous experiments and disclosures, that the Custer channel provides a most effective and increased lift at speeds approaching a minimum such as exist during take-off and landing. A further object of the present invention is to provide means for varying the amount of lift at the forward end of an aircraft to facilitate rapid take-offs.

A still further object of the present invention is to provide an extendable Custer channel which will operate as a brake when projected with the engine idling, thereby increasing drag and retarding speed of the aircraft.

Another object of the present invention is to provide a means of rapidly varying the lift of a jet propelled aircraft whereby, under full throttle condition, an extremely rapid climb and ascent of the craft is possible.

A still further object of the invention is to provide jet propelled aircraft in which the effective speed range is broadened so that lower landing and take-off speeds are possible while at the same time the maximum speed which can be attained is increased.

Other objects and advantages of the invention will be readily apparent from the following detailed description of embodiments of the invention taken together with the accompanying drawings in which.

Figure 1:
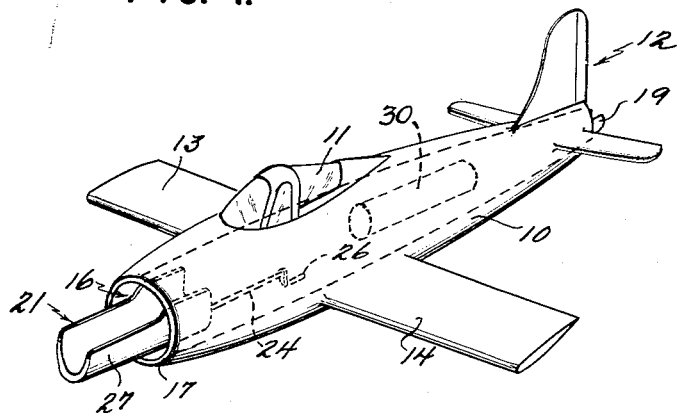
Fig. 1 is a perspective view of an aircraft embodying my invention.

The aircraft of the present invention includes a fuselage 10 having the usual cockpit 11 and empennage 12. Wings 13 and 14 are mounted on either side of the fuselage 10 in the usual manner. The fuselage 10 is provided with a jet tube 15 extending longitudinally through the aircraft and which is open at the nose and tail. The nose opening 16 is faired as indicated at 17 by a cowling 18.

The upper half of the tail terminal of the tube 15 can, if desired, be removed to provide an upwardly opening channel 19 as taught in my previous patent. This upwardly opening channel is not an absolute necessity in the present invention, however, and can be omitted.

A jet engine 30 is mounted in jet tube 15 intermediate of the nose opening 16 and the tail end of tube 15. A portion of a jet intake duct is indicated at 20 in Fig. 2, which leads to the jet engine.

An extendable channel 21 is movably mounted in the forward end of the jet tube 15 in any desired manner. As shown in the drawings, a rack 22 is provided on the lower portion of the channel 21. The rack 22 cooperates with a worm gear 23 which is attached on the end of control rod 24. The control rod 24 is rotatably mounted in tube 15 by means of brackets 25 or the like. The control rod 24 extends backwardly and in the cockpit 11, a handle 26 or the like can be provided for turning or rotating the rod.

Figure 2:
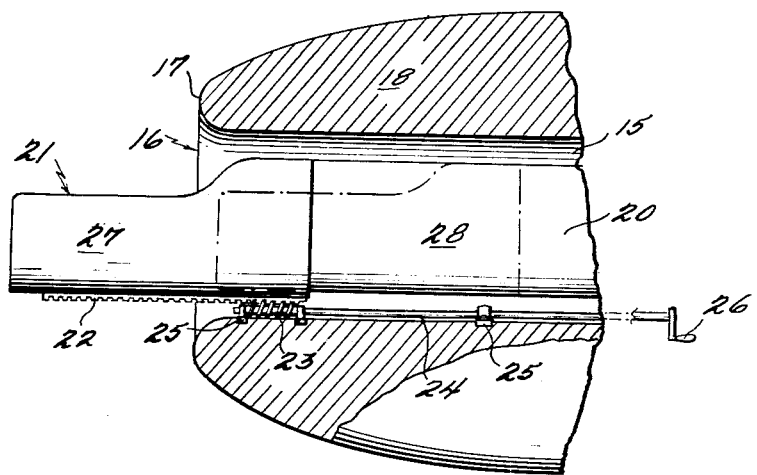
Fig. 2 is a partial view of the nose of an aircraft showing my invention mounted in operative position.

The extendable channel 21 partially surrounds the jet intake duct 20 and is movable with respect thereto. In Fig. 2 of the drawings the channel is shown at 27, in full lines in fully projected position. The fully retracted position of the channel is shown at 28 in dotted lines in this figure. By turning handle 26, the channel 21 can be moved from the projected position 27 to any intermediate or fully retracted position 28. The travel limit of the channel is designed to permit full withdrawal of the channel into the jet tube 15 and removed from the nose opening 16 and also to extend sufficiently far in advance of the nose of the aircraft to give the desired effect when projected.

When the channel is moved to the projected position 27, it creates a great increase in lift at the nose of the craft and this will greatly facilitate both landing and take-off of the craft in a known manner. The maximum lift available is obtained when the engine is operating under full throttle. The angle of attack of the aircraft can of course be varied rapidly by means of the extendable channel when operating under full power conditions so as to facilitate the rate and angle of climb of the aircraft under any conditions such as in combat or over rough terrain.

The rear channel, indicated at 19, in conjunction with the channel 21 permits increasing the overall lift of the aircraft and greatly increases the stability of the craft at landing and take-off speeds.

In addition to permitting varying of the lift at the front of the craft, the channel 21 also is operable as a brake. When the channel 21 is projected with the engine idling, it acts as a drag and accordingly retards the speed of the aircraft. When the engine is again speeded up, the channel 21 will again act as a lift device.

To enhance the braking effect of the present invention, the channel 21 is projected and the engine is speeded up. This creates a high lift at the nose of the aircraft and accordingly increases the angle of attack of the plane. This forms a brake by increasing the drag. The braking is effected by short bursts of power and then return to idling speed, since otherwise the ship would climb rapidly. This ability to rapidly brake the plane and yet maintain stability at all critical speeds renders aircraft equipped with this invention extremely maneuverable and well adapted to aircraft carrier work and small field operation. The ability to maneuver at low speeds and yet to ascend rapidly manifestly renders such aircraft extremely useful for many diversified types of operations which will be apparent to those skilled in the art.

While the embodiment described above utilizes the extendable channel only in a jet tube extending through the fuselage, such extendable channels could be utilized at other locations in the aircraft, such as, in the wings or lifting surfaces. The operation of extendable channels in these locations will be apparent from the foregoing description.

The active areas of the channels in the nose, and if used, that at the tail of the aircraft can be varied to give the overall desired effect. Furthermore, the extent of movement of the front channel can be varied. While mechanical means have been illustrated for projecting and retracting the nose channel, obviously other methods of effecting this could be utilized such as hydraulic or electric means, depending upon the necessities and desired type of operation.

Various changes and minor modifications may be made in the present invention without departing from the spirit and scope thereof as defined in the appended claims.

I claim:

1. An aircraft comprising a fuselage, wings on said fuselage, a jet tube extending longitudinally through the fuselage, the opposite ends of said fuselage being open, a jet motor mounted in said jet tube intermediate the open ends thereof and in communication therewith, an upwardly and forwardly opening channel in the forward end of said tube in alignment with and adjoining the forward end of said tube, said channel being movably mounted for extension forwardly of the forward end of said tube and the nose of the aircraft.

2. An aircraft as claimed in claim 1, said channel being movable forwardly and backwardly into selective projected or retracted positions.

3. An aircraft as claimed in claim 2, and including means for selectively and adjustably projecting and retracting said channel.

4. An aircraft as claimed in claim 3, the tail end of said fuselage being semi-cylindrical and opening upwardly and rearwardly to form a channel.

5. An aircraft comprising a longitudinally extending tubular fuselage, wings extending from the opposite sides of said fuselage, the opposite ends of the fuselage being open in the direction of flight, a jet motor mounted in the fuselage intermediate the nose and tail ends thereof and an extendable forwardly and upwardly open channel mounted in alignment with and adjoining the forward open end of said fuselage.

6. An aircraft as claimed in claim 5, and including means for projecting said channel outwardly from the nose and retracting said channel entirely within the fuselage.

7. An aircraft comprising a longitudinally extending combined jet tube and fuselage open at both ends in the direction of flight, a jet engine in said jet tube, a jet intake duct leading from, and in proximity to, the forward end of the jet tube to said jet engine, an upwardly and forwardly open channel mounted within said jet tube in alignment with and adjoining the forward end of said jet tube and longitudinally movable with respect to said jet intake duct whereby said channel can be projected outwardly from the nose of the aircraft.

8. In an aircraft having a longitudinally extending jet motor, a jet tube, a jet intake duct in said jet tube communicating with said jet motor, an upwardly and forwardly open channel longitudinally movably mounted in said jet tube in alignment with and adjoining the forward end thereof, said channel being projectable from and out of the forward end of said jet tube.

9. In an aircraft having a jet motor mounted in an open ended longitudinally extending jet tube, an upwardly and forwardly open channel movably mounted in alignment with and adjoining the forward end of said jet tube, said channel being selectively longitudinally projectable from the forward end of said jet tube.

References Cited in the file of this patent
UNITED STATES PATENTS
2,611,555    Custer _____ Sept. 23, 1952